(12) United States Patent
Huang et al.

(10) Patent No.: US 8,559,803 B2
(45) Date of Patent: Oct. 15, 2013

(54) PHOTOGRAPHING MODULE (75) Inventors: Chen Yi Huang, Taichung (TW); Te Sheng Tseng, Taichung (TW); Wen Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 53 days.

(21) Appl. No.: 13/167,190

(22) Filed: Jun. 23, 2011

(65) Prior Publication Data

US 2012/0251088 A1 Oct. 4, 2012

(30) Foreign Application Priority Data

Mar. 30, 2011 (TW) .............................. 100110927 A (51) Int. Cl.
G03B 17/00 (2006.01)
(52) U.S. Cl.
USPC .......................................................... 396/52
(58) Field of Classification Search
USPC ...................................................... 396/52, 55
See application file for complete search history.

(56) References Cited

U.S. PATENT DOCUMENTS

2006/0092285 A1   5/2006  Shin
2008/0240704 A1*  10/2008 Takahashi ..................... 396/419
2011/0091193 A1*  4/2011  Lim et al. ....................... 396/133
2011/0102920 A1*  5/2011  Shyu et al. ..................... 359/823
2011/0211821 A1*  9/2011  Park et al. ....................... 396/55

* cited by examiner

Primary Examiner — Clayton E Laballe
Assistant Examiner — Noam Reisner
(74) Attorney, Agent, or Firm — Morris Manning & Martin LLP; Tim Tingkang Xia, Esq.

(57) ABSTRACT

This invention provides a photographing module comprising: a supporting frame having a movable element accommodation space, at least one first elastic element accommodation space and at least one first electrically-driven element accommodation space; a movable element having an optical system unit, at least one second electrically-driven element accommodation space and at least one second elastic element accommodation space, the movable element being received by the movable element accommodation space; an electrically-driven element received by the at least one first electrically-driven element accommodation space and the at least one second electrically-driven element accommodation space; an elastic element received by the at least one first elastic element accommodation space and the at least one second elastic element accommodation space, the elastic element being capable of sliding in the at least one second elastic element accommodation space; a vibration sensor disposed at a proper position of the photographing module for detecting a direction and a magnitude of a vibration; and a photo sensor disposed at an image side of the photographing module.

10 Claims, 7 Drawing Sheets

PHOTOGRAPHING MODULE

CROSS-REFERENCE TO RELATED APPLICATIONS

This non-provisional application claims priority under 35 U.S.C. §119(a) on Patent Application No. 100110927 filed in Taiwan, R.O.C. on Mar. 30, 2011, the entire contents of which are hereby incorporated by reference.

BACKGROUND OF THE INVENTION

1. Field of the Invention

The present invention relates to a photographing module, and more particularly, to a photographing module featuring fewer parts and lower cost and capable of compensating blurry images caused by shakes.

2. Description of the Prior Art

US Publication No. 2006/0092285 discloses an optical image stabilizer for camera lens assembly comprising: a holder having a movable element accommodation space; a movable element having a light-sensing element and connected with the holder, the movable element and the holder being spaced apart from each other; a magnetic element set connected with the movable element; a set of balls comprising at least three balls and interposed between the movable element and the holder; and an electrically-driven element configured to cause the movable element to move in the X plane and Y plane; wherein the magnetic element set provides a magnetic force to keep the balls between the movable element and the holder. Blurry images caused by the shaking of the camera lens assembly can be corrected by means of the electrically-driven element.

Though the aforementioned technology enables the movable element to move in two axis directions, flux leakage may occur easily in the magnetic element and affect peripheral electronic components. Moreover, the assembly of numerous parts is not easy, and the large number of parts also makes it difficult to reduce the size and cost of the product.

SUMMARY OF THE INVENTION

To overcome the drawbacks of the prior art technology, the present invention provides a photographing module featuring fewer parts and lower cost.

The present invention provides a photographing module comprising: a supporting frame having a movable element accommodation space, at least one first elastic element accommodation space and at least one first electrically-driven element accommodation space; a movable element having an optical system unit, at least one second electrically-driven element accommodation space and at least one second elastic element accommodation space, the movable element being received by the movable element accommodation space of the supporting frame; an electrically-driven element received by the at least one first electrically-driven element accommodation space of the supporting frame and the at least one second electrically-driven element accommodation space of the movable element and configured to cause the movable element to move in at least one axis direction; an elastic element received by the at least one first elastic element accommodation space of the supporting frame and the at least one second elastic element accommodation space of the movable element and configured to provide an elastic force in at least one axis direction, the elastic element being capable of sliding in the at least one second elastic element accommodation space of the movable element; a vibration sensor disposed at any proper position of the photographing module for detecting a direction and a magnitude of a vibration; and a photo sensor disposed at an image side of the photographing module.

The present invention provides another photographing module comprising: a supporting frame having a movable element accommodation space, at least one first elastic element accommodation space and at least one first electrically-driven element accommodation space; a movable element having an optical system unit, at least one second elastic element accommodation space, at least one second electrically-driven element accommodation space and a photo sensor disposed at an image side of the optical system unit, the movable element being received by the movable element accommodation space of the supporting frame; an electrically-driven element received by the at least one first electrically-driven element accommodation space of the supporting frame and the at least one second electrically-driven element accommodation space of the movable element and configured to cause the movable element to move in at least one axis direction; an elastic element received by the at least one first elastic element accommodation space of the supporting frame and the at least one second elastic element accommodation space of the movable element and configured to provide an elastic force in at least one axis direction, the elastic element being capable of sliding in the at least one second elastic element accommodation space of the movable element; and a vibration sensor disposed at any proper position of the photographing module for detecting a direction and a magnitude of a vibration.

DETAILED DESCRIPTION OF THE PREFERRED EMBODIMENTS

The present invention will be described more fully hereinafter with reference to the accompanying drawings, in which preferred embodiments of the present invention are shown.

Figure 1A:
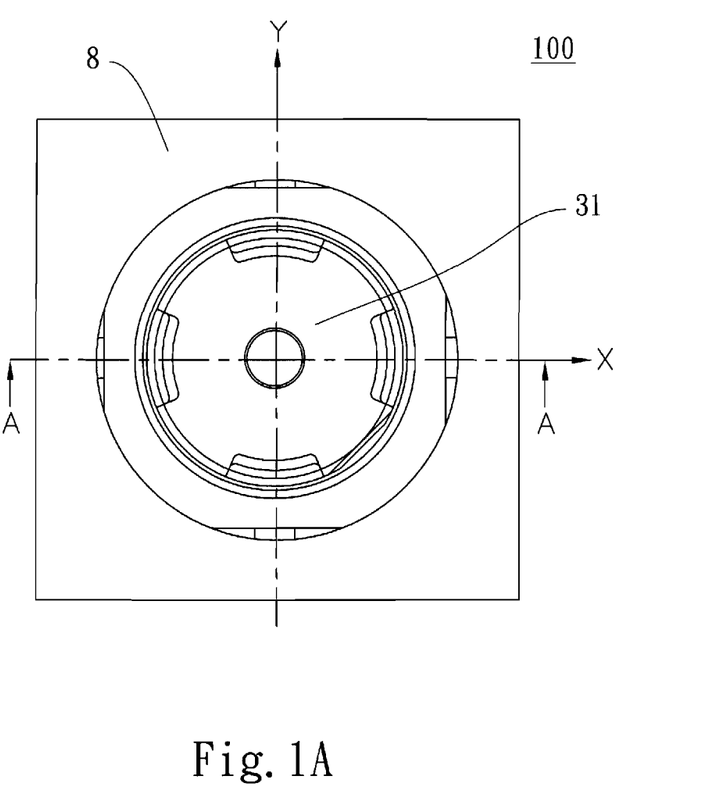
FIG. 1A is a top view showing a photographing module in accordance with a first embodiment of the present invention.
Figure 1B:
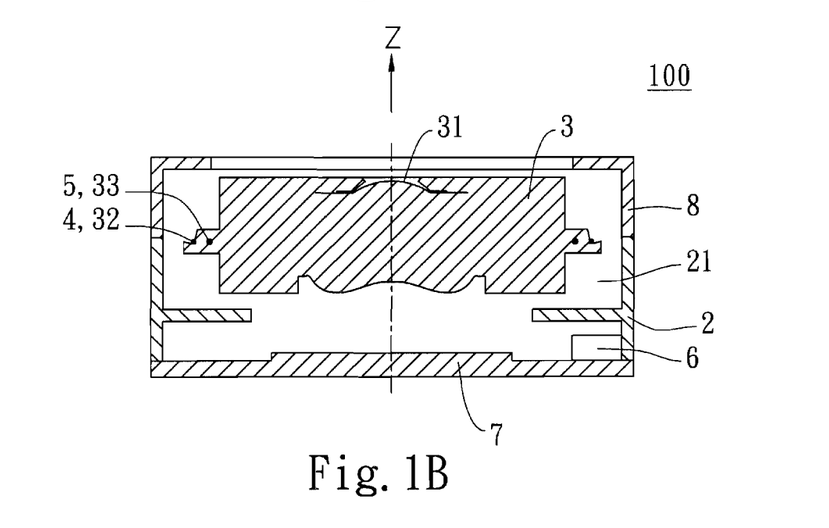
FIG. 1B is a section view of the photographing module taken along the line A-A in FIG. 1A.
Figure 2A:
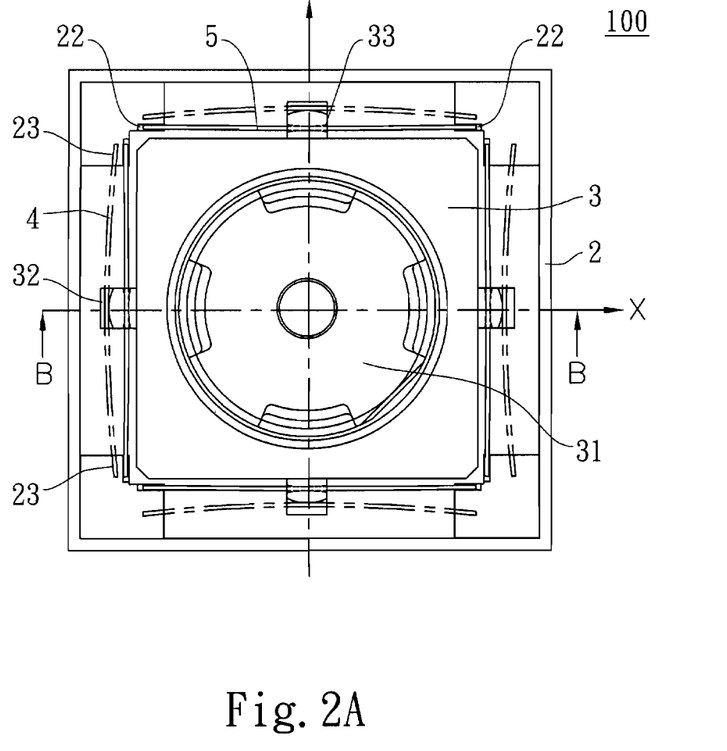
FIG. 2A is a top view showing the photographing module without the cover in accordance with the first embodiment of the present invention.
Figure 2B:
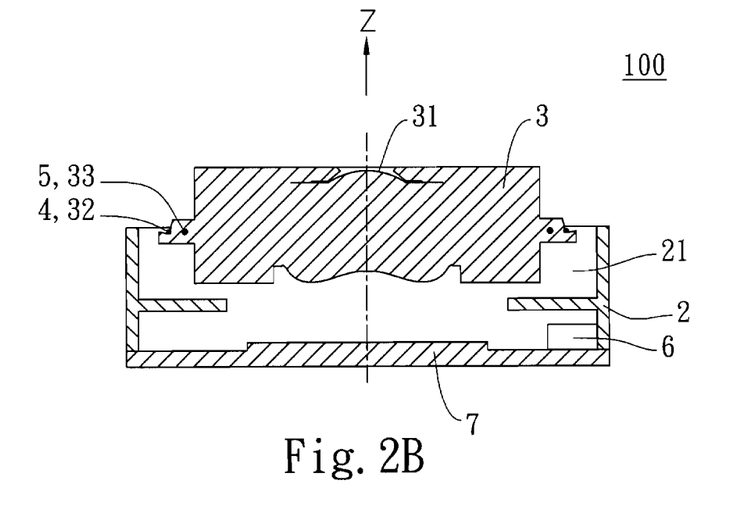
FIG. 2B is a section view of the photographing module taken along the line B-B in FIG. 2A.

FIG. 1A is a top view showing a photographing module 100 in accordance with a first embodiment of the present invention, and FIG. 1B is a section view of the photographing module 100 taken along the line A-A in FIG. 1A. FIG. 2A is a top view showing the photographing module 100 without a cover 8 in accordance with the first embodiment of the present invention, and FIG. 2B is a section view of the photographing module 100 taken along the line B-B in FIG. 2A. In the first embodiment of the present invention, there is provided a photographing module 100 comprising: a supporting frame 2 having a movable element accommodation space 21, four first elastic element accommodation spaces 22 and four first electrically-driven element accommodation spaces 23, the four first elastic element accommodation spaces 22, as well as the four first electrically-driven element accommodation spaces 23, being arranged respectively at the four corners of the supporting frame 2; a movable element 3 having an optical system unit 31, four second electrically-driven element accommodation spaces 32 and four second elastic element accommodation spaces 33, the four second electrically-driven element accommodation spaces 32, as well as the four second elastic element accommodation spaces 33, being arranged respectively at the four sides of the movable element 3 corresponding to the four first electrically-driven element accommodation spaces 23 and the four first elastic element accommodation spaces 22 of the supporting frame 2, the movable element 3 being received by the movable element accommodation space 21 of the supporting frame 2; an electrically-driven element 4 received by the first electrically-driven element accommodation space 23 of the supporting frame 2 and the second electrically-driven element accommodation space 32 of the movable element 3 and configured to cause the movable element 3 to move in at least two axis directions (the X axis and Y axis as shown in the drawings) which are perpendicular to an optical axis (the Z axis as shown in the drawings); an elastic element 5 received by the first elastic element accommodation space 22 of the supporting frame 2 and the second elastic element accommodation space 33 of the movable element 3 and configured to provide elastic forces in at least two axis directions, the elastic element 5 being capable of sliding in the second elastic element accommodation space 33 of the movable element 3; a vibration sensor 6 disposed at any proper position of the photographing module 100 for detecting a direction and a magnitude of a vibration; a photo sensor 7 disposed at an image side of the photographing module 100 and connected with the supporting frame 2; and a cover 8 disposed on and connected with the supporting frame 2.

Preferably, the electrically-driven element 4 is a shape memory alloy (SMA) or a voice coil motor (VCM). Alternatively, the electrically-driven element 4 is made of piezoelectric material. Moreover, the elastic element 5 is a wire spring or a flat spring. Furthermore, the photo sensor 7 may be a complementary metal-oxide semiconductor (CMOS) or a charge coupled device (CCD).

Figure 1C:
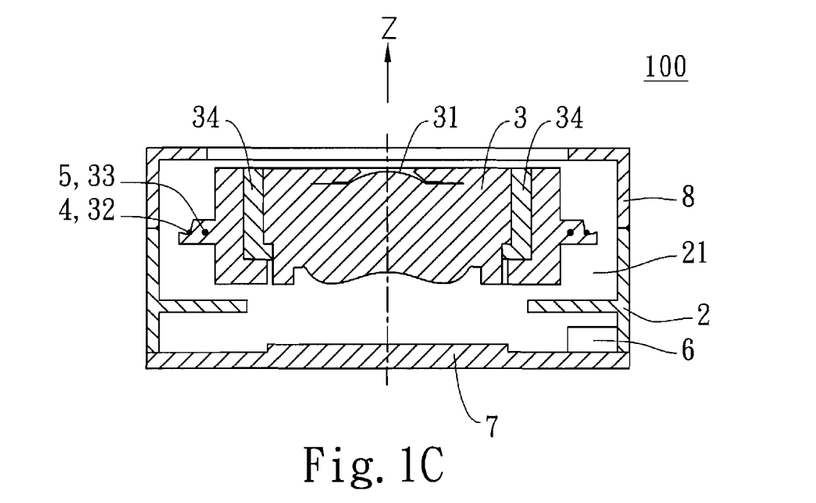
FIG. 1C is a section view of the photographing module comprising an electrically-driven focusing element taken along the line A-A in FIG. 1A.
Figure 1D:
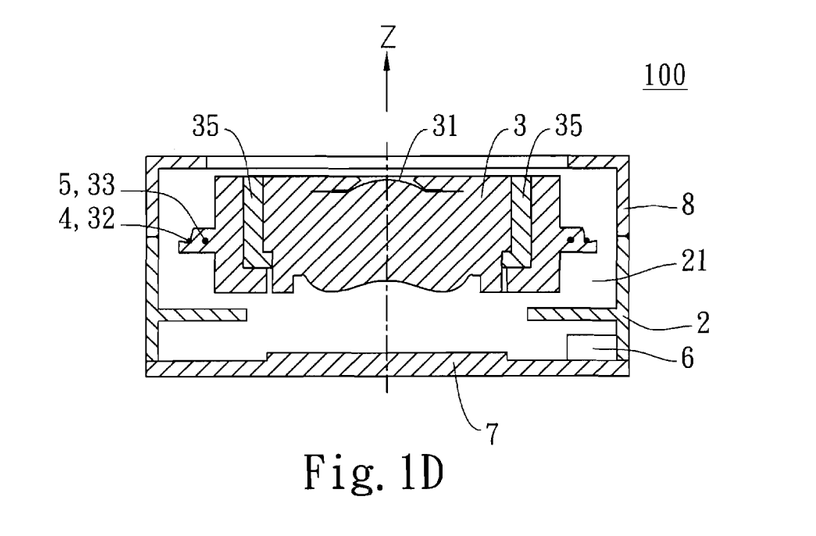
FIG. 1D is a section view of the photographing module comprising an electrically-driven zooming element taken along the line A-A in FIG. 1A.

FIG. 1C is a section view of the photographing module 100 comprising an electrically-driven focusing element 34 taken along the line A-A in FIG. 1A. In the first embodiment, it is preferable that the movable element 3 further comprises an electrically-driven focusing element 34 configured to provide the photographing module 100 with an auto-focusing function. FIG. 1D is a section view of the photographing module 100 comprising an electrically-driven zooming element 35 taken along the line A-A in FIG. 1A. In the first embodiment, it is preferable that the movable element 3 further comprises an electrically-driven zooming element 35 configured to provide the photographing module 100 with a zooming function.

Referring to FIGS. 2A and 2B, the four electrically-driven elements 4, as well as the four elastic elements 5, are arranged respectively at the four sides of the movable element 3.

In the first embodiment of the present invention, each of the four electrically-driven elements 4 is a SMA received by the first electrically-driven element accommodation space 23 and the second electrically-driven element accommodation space 32, and each of the four elastic elements 5 is a wire spring received by the first elastic element accommodation space 22 and the second elastic element accommodation space 33. When changes are detected by the vibration sensor 6, power is immediately supplied to the SMA. Accordingly, heat is generated in the interior of the SMA and causes a change in the length of the SMA, thereby the curved electrically-driven element 4 becomes straight and the change in the length of the electrically-driven element 4 exerts a force to the movable element 3 to cause the movement of the movable element 3. For example, as shown in FIG. 2A, the electric current can be simultaneously supplied to the SMAs disposed respectively at the left, right, top and bottom sides of the movable element 3 so as to cause the movable element 3 to move in the positive X-axis direction and negative Y-axis direction at the same time, and the magnitude of the applied electric current is determined depending on the amount of movement required. In other words, the electric current can be supplied to any one of the four SMAs or a pair of SMAs movable in the X-axis direction or Y-axis direction, depending on the axis direction in which the movable element 3 is to move and the amount of movement required. In this embodiment, the movement of the movable element 3 in the X-axis direction and Y-axis direction can be controlled by controlling the two pairs of SMAs movable with respect to the X axis and Y axis, respectively. When the magnitude of the electric current is decreased, the degree of changes in the length of the SMA is smaller, and then the restoring force of the elastic element 5 brings the movable element 3 back to the initial position. That is, the restoring force causes the movable element 3 to move in the negative X-axis direction and positive Y-axis direction to return to the initial position, thereby compensating the blurry images caused by the shaking of the photographing module 100.

Figure 3:
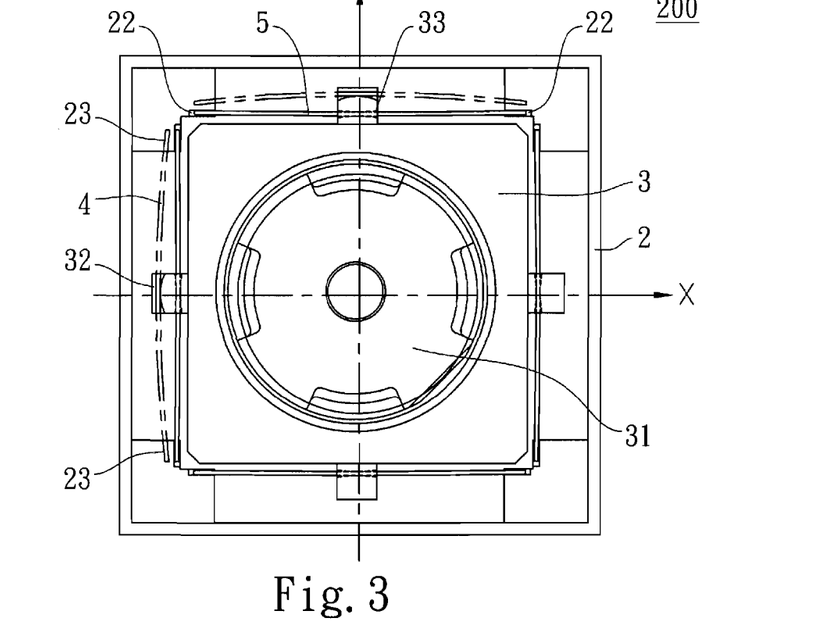
FIG. 3 is a top view showing a photographing module in accordance with a second embodiment of the present invention.

FIG. 3 is a top view showing a photographing module 200 in accordance with a second embodiment of the present invention. In the photographing module 200, two electrically-driven elements 4 are arranged respectively at two adjacent sides of the movable element 3, and four elastic elements 5 are arranged respectively at the four sides of the movable element 3. Each of the two electrically-driven elements 4 is a SMA, and each of the four elastic elements 5 is a wire spring. The operation of the electrically-driven element 4, the elastic element 5 and the movable element 3 with respect to each other has been described above, thus no further discussion will be made here.

Figure 4:
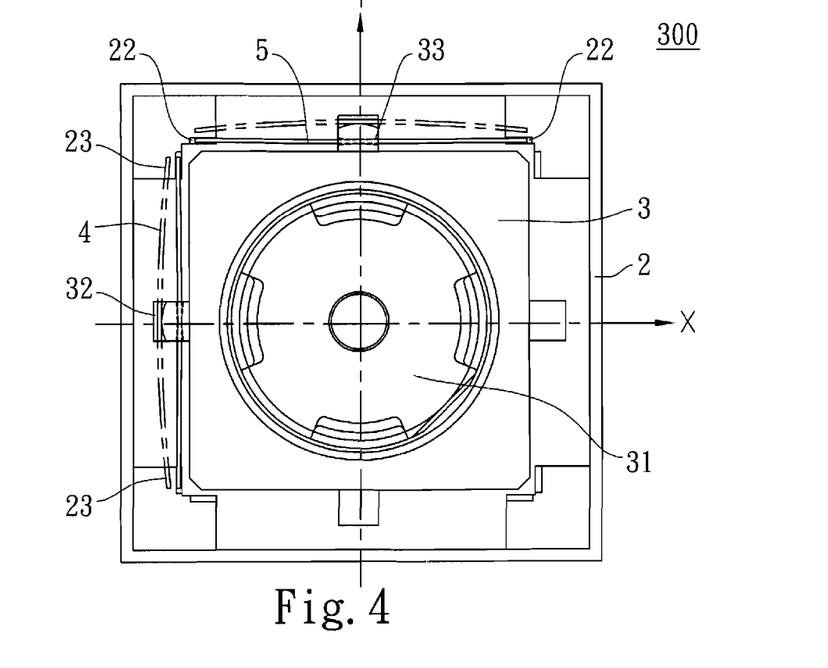
FIG. 4 is a top view showing a photographing module in accordance with a third embodiment of the present invention.

FIG. 4 is a top view showing a photographing module 300 in accordance with a third embodiment of the present invention. In the photographing module 300, two electrically-driven elements 4, as well as two elastic elements 5, are arranged respectively at two adjacent sides of the movable element 3. Each of the two electrically-driven elements 4 is a SMA, and each of the two elastic elements 5 is a wire spring. The operation of the electrically-driven element 4, the elastic element 5 and the movable element 3 with respect to each other has been described above, thus no further discussion will be made here.

Figure 5A:
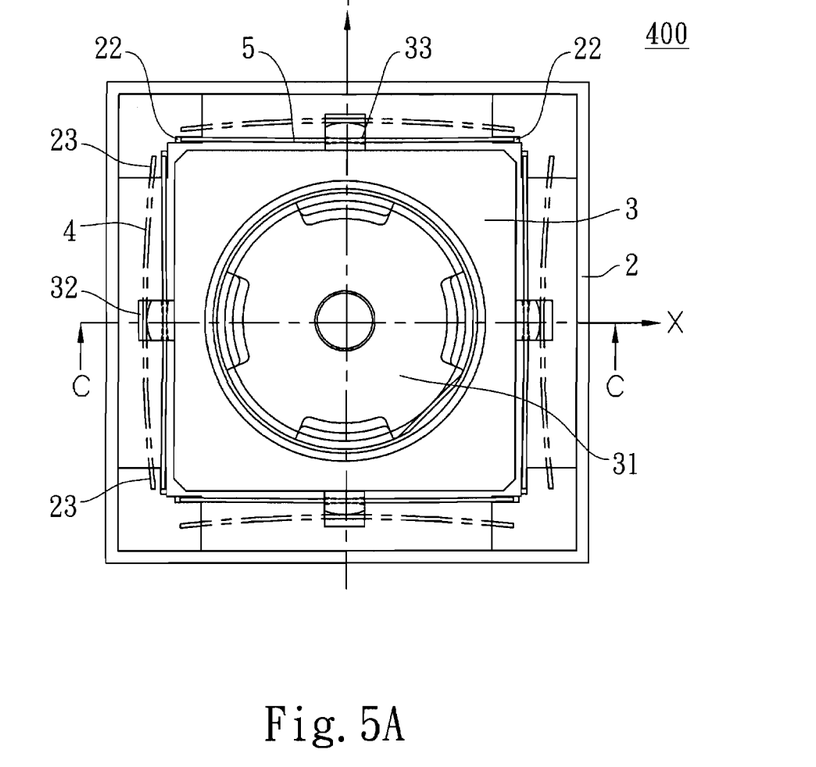
FIG. 5A is a top view showing a photographing module in accordance with a fourth embodiment of the present invention.
Figure 5B:
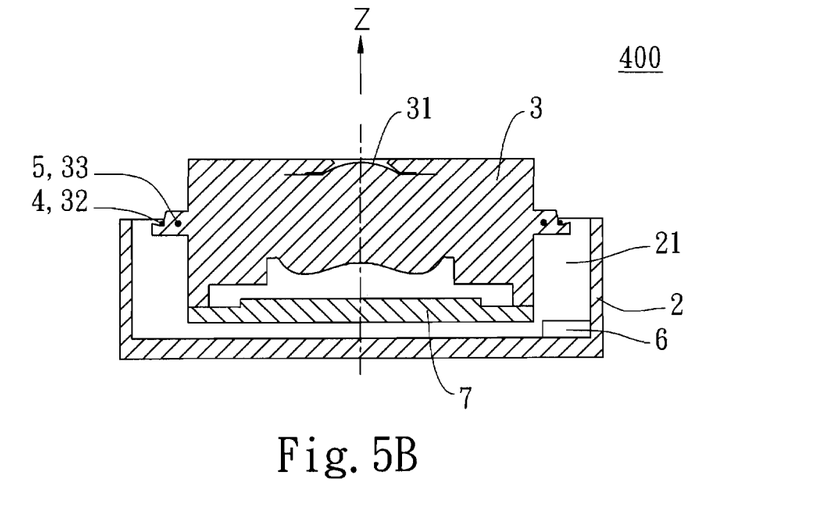
FIG. 5B is a section view of the photographing module taken along the line C-C in FIG. 5A.

FIG. 5A is a top view showing a photographing module 400 in accordance with a fourth embodiment of the present invention, and FIG. 5B is a section view of the photographing module 400 taken along the line C-C in FIG. 5A. The photographing module 400 of the fourth embodiment and the photographing module 100 of the first embodiment shown in FIGS. 2A and 2B are different in that the photo sensor 7 of the photographing module 400 of the fourth embodiment is disposed at an image side of the photographing module 400 and connected with the movable element 3 while the photo sensor 7 of the photographing module 100 of the first embodiment is disposed at an image side of the photographing module 100 and connected with the supporting frame 2. In the fourth embodiment, the movable element 3 and the photo sensor 7 are caused to move when the electrically-driven element 4 is activated.

Figure 6A:
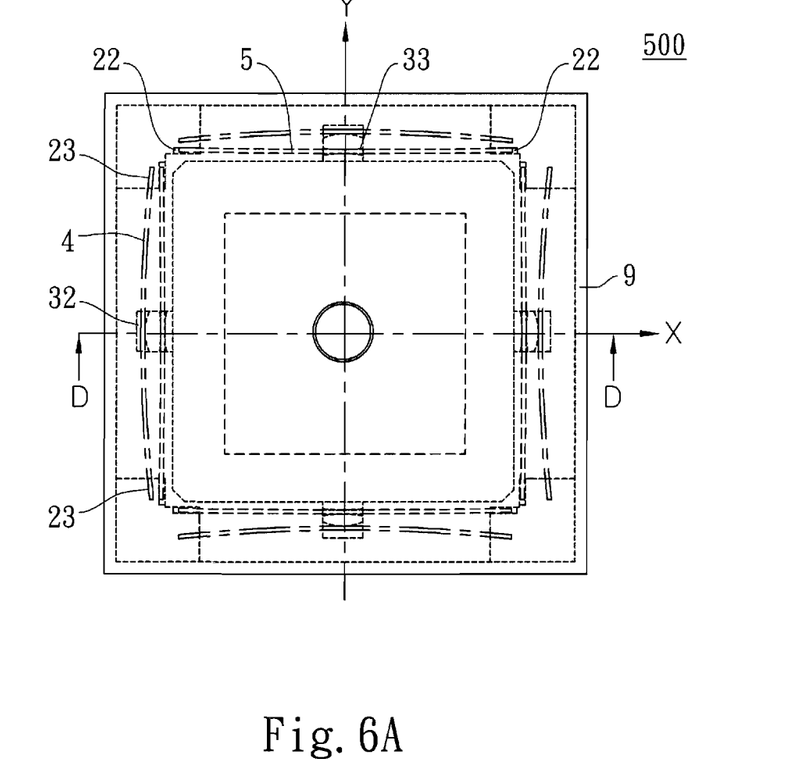
FIG. 6A is a top view showing a photographing module in accordance with a fifth embodiment of the present invention.
Figure 6B:
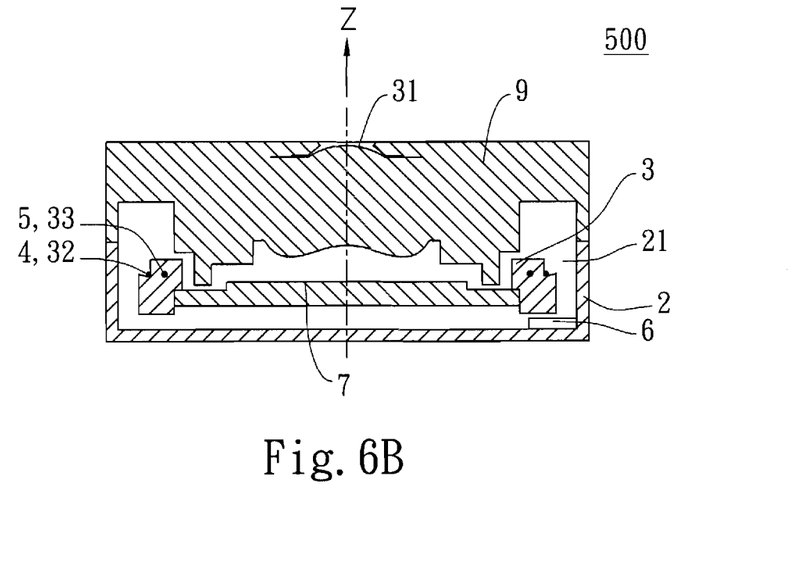
FIG. 6B is a section view of the photographing module taken along the line D-D in FIG. 6A.

FIG. 6A is a top view showing a photographing module 500 in accordance with a fifth embodiment of the present invention, and FIG. 6B is a section view of the photographing module 500 taken along the line D-D in FIG. 6A. In the fifth embodiment of the present invention, there is provided a photographing module 500 comprising: a lens assembly 9 having an optical system unit 31; a supporting frame 2 having a movable element accommodation space 21, a first elastic element accommodation space 22 and a first electrically-driven element accommodation space 23; a movable element 3 having a photo sensor 7, a second electrically-driven element accommodation space 32 and a second elastic element accommodation space 33, the movable element 3 being received by the movable element accommodation space 21 of the supporting frame 2; an electrically-driven element 4 received by the first electrically-driven element accommodation space 23 of the supporting frame 2 and the second electrically-driven element accommodation space 32 of the movable element 3 and configured to cause the movable element 3 to move in at least two axis directions which are perpendicular to an optical axis, the electrically-driven element 4 being a SMA; an elastic element 5 received by the first elastic element accommodation space 22 of the supporting frame 2 and the second elastic element accommodation space 33 of the movable element 3 and configured to provide elastic forces in at least two axis directions, the elastic element 5 being capable of sliding in the second elastic element accommodation space 33 of the movable element 3, the elastic element 5 being a wire spring; and a vibration sensor 6 disposed at a proper position for detecting a vibration. The first and fifth embodiments are different in that the optical system unit 31 is movable in the first embodiment while the photo sensor 7 is movable in the fifth embodiment.

Figure 7A:
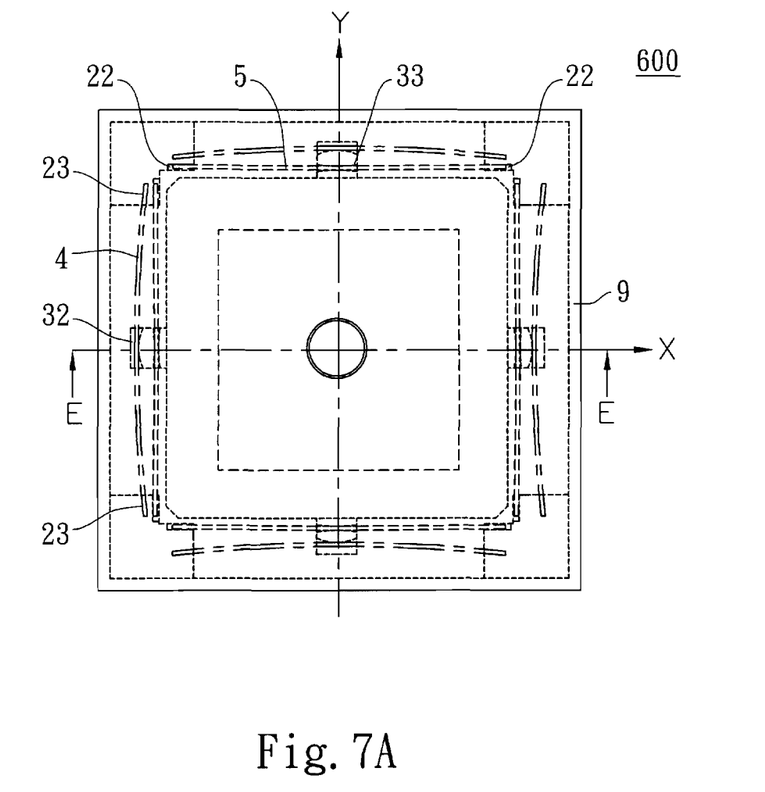
FIG. 7A is a top view showing a photographing module in accordance with a sixth embodiment of the present invention.
Figure 7B:
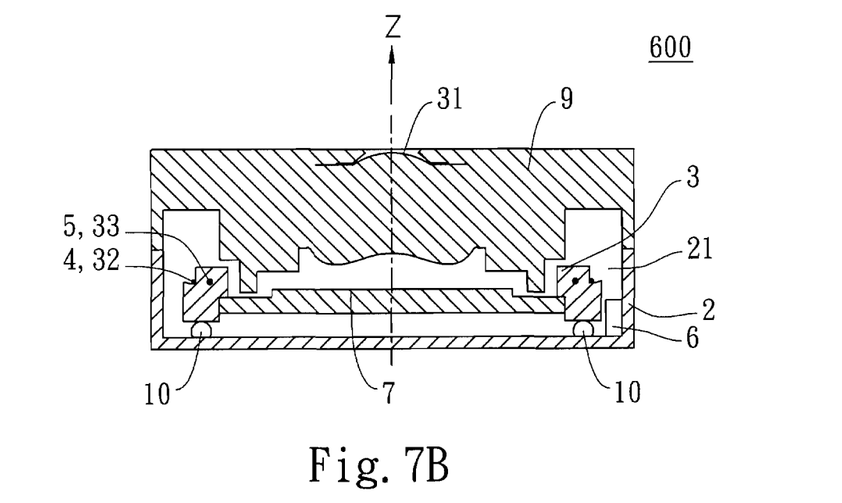
FIG. 7B is a section view of the photographing module taken along the line E-E in FIG. 7A.

FIG. 7A is a top view showing a photographing module 600 in accordance with a sixth embodiment of the present invention, and FIG. 7B is a section view of the photographing module 600 taken along the line E-E in FIG. 7A. In this embodiment, the photographing module 600 further comprises at least one ball 10 disposed between the movable element 3 and the supporting frame 2 so as to reduce its vibration and stabilize itself in the Z-axis direction.

The preferred embodiments described above are exemplary and are not intended to limit the claim scope of the present invention. Various modifications and variations made within the spirit of the invention to achieve equivalent effect shall be considered as falling within the scope of the appended claims.

What is claimed is:

1. A photographing module comprising:
a supporting frame having a movable element accommodation space formed in a central portion thereof, a plurality of first elastic element accommodation spaces and a plurality of first electrically-driven element accommodation spaces, being formed respectively at corners of the supporting frame;
a movable element having an optical system unit, a plurality of second electrically-driven element accommodation spaces and a plurality of second elastic element accommodation spaces, being formed as grooves respectively at four sides of the movable element and corresponding to the first elastic element accommodation spaces and the first electrically-driven element accommodation spaces, the movable element being received by the movable element accommodation space of the supporting frame;
at least one electrically-driven element received by at least one said first electrically-driven element accommodation space of the supporting frame and at least one said second electrically-driven element accommodation space of the movable element and configured to cause the movable element to move in at least one axis direction;
at least one elastic element, wherein two ends of the at least one elastic element are respectively received by two of said plurality of first elastic element accommodation spaces of the supporting frame, part of the at least one elastic element between the two ends is threaded in one said second elastic element accommodation space of the movable element, the at least one elastic element is configured to provide an elastic force in at least one axis direction, and the elastic element is capable of sliding in at least one said second elastic element accommodation space of the movable element;
a vibration sensor disposed at any proper position of the photographing module for detecting a direction and a magnitude of a vibration; and
a photo sensor disposed at an image side of the photographing module.

2. The photographing module according to claim 1, wherein the electrically-driven element is a shape memory alloy (SMA).

3. The photographing module according to claim 1, wherein the electrically-driven element is made of piezoelectric material.

4. The photographing module according to claim 1, wherein the electrically-driven element is a voice coil motor (VCM).

5. The photographing module according to claim 1, wherein the elastic element is a wire spring or a flat spring.

6. The photographing module according to claim 1, wherein the movable element further comprises an electrically-driven focusing element configured to provide the photographing module with an auto-focusing function.

7. The photographing module according to claim 1, wherein the movable element further comprises an electrically-driven zooming element configured to provide the photographing module with a zooming function.

8. A photographing module comprising:
a supporting frame having a movable element accommodation space formed in a central portion thereof, a plurality of first elastic element accommodation spaces and a plurality of first electrically-driven element accommodation spaces, being formed respectively at corners of the supporting frame;

a movable element having an optical system unit, a plurality of second elastic element accommodation spaces, a plurality of second electrically-driven element accommodation spaces, being formed as grooves respectively at four sides of the movable element and corresponding to the first elastic element accommodation spaces and the first electrically-driven element accommodation spaces, and a photo sensor disposed at an image side of the optical system unit, the movable element being received by the movable element accommodation space of the supporting frame;

at least one electrically-driven element received by at least one said first electrically-driven element accommodation space of the supporting frame and at least one said second electrically-driven element accommodation space of the movable element and configured to cause the movable element to move in at least one axis direction;

at least one elastic element, wherein two ends of the at least one elastic element are respectively received by two of said plurality of first elastic element accommodation spaces of the supporting frame, part of the at least one elastic element between the two ends is threaded in one said second elastic element accommodation space of the movable element, the at least one elastic element is configured to provide an elastic force in at least one axis direction, and the elastic element is capable of sliding in the at least one second elastic element accommodation space of the movable element; and a vibration sensor disposed at any proper position of the photographing module for detecting a direction and a magnitude of a vibration.

9. The photographing module according to claim 8, wherein the movable element further comprises an electrically-driven focusing element configured to provide the photographing module with an auto-focusing function.

10. The photographing module according to claim 8, wherein the movable element further comprises an electrically-driven zooming element configured to provide the photographing module with a zooming function.

* * * * *